Sept. 8, 1970  J. P. HINGST ET AL  3,527,676
MULTISTAGE DISTILLATION FOR DESALINIZING SALINE WATER
Filed July 1, 1968
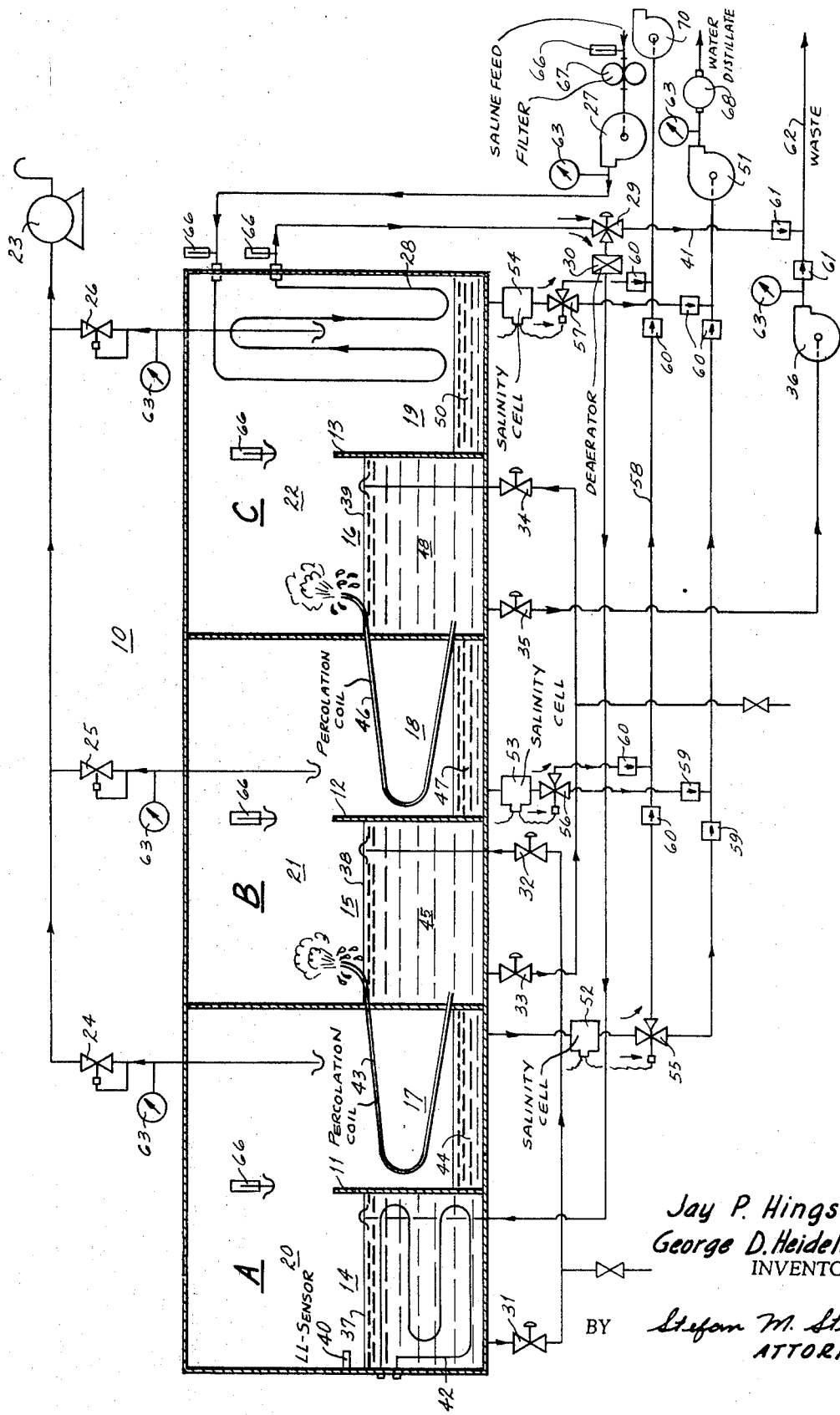
Jay P. Hingst
George D. Heidelbaugh
INVENTOR.
BY Stefan M. Stein
ATTORNEY 3,527,676
MULTISTAGE DISTILLATION FOR
DESALINIZING SALINE WATER
Jay P. Hingst, 204 18th Ave., Indian Rocks Beach, Fla.
33535, and George D. Heidelbaugh, 4576 22nd Ave.
N., St. Petersburg, Fla. 33710
Filed July 1, 1968, Ser. No. 741,585
Int. Cl. B01d 3/06; C02 1/06
U.S. Cl. 203—11                                                7 Claims

ABSTRACT OF THE DISCLOSURE

Method and multistage apparatus especially useful for converting saline to potable water. Each stage employs successively lower temperature and lower pressure to vaporize the water. The heat released in condensing the vapor of each stage is utilized in a subsequent stage to heat the saline water of said subsequent stage to its point of vaporization.

This invention relates to method and apparatus especially useful for recovering potable water from sea water.

Due to increasing world population, extensive irrigation projects and the like, presently available fresh water supplies will not be able to sustain future demands. One solution is to tap the oceans and convert that immense supply of saline water into potable water. However, to be successful, any large-scale conversion must be economical. One of the main difficulties in present day conversion techniques of saline water to potable water involves the scaling and corrosion accompanying conventional multistage/distilling plant operations.

Untreated sea water can be heated to approximately 165° F. without initiation of rapid scaling. To avoid scaling, it has been necessary to maintain the temperature of the sea water in the distilling plant below this critical scaling temperature. Unfortunately, however, known low temperature plants are inefficient and costly.

It is an object of this invention to provide novel efficient non-scaling low-temperature saline water multistage distilling apparatus and method, using a unique heat transfer percolation system.

Another object is to provide distillation apparatus of the above character, which efficiently utilizes the exothermic heat of condensation of vapor in one stage to heat the saline water of a subsequent stage, through said heat transfer percolation system.

Still another object is to provide distillation apparatus of the above character having subatmospheric stages; whereby saline water may be vaporized in all stages by a singular application of heat to the first stage.

A further object is to provide distillation apparatus of the above character wherein the subatmosphere of each stage is assisted by the condensation of water therein.

Other objects of the invention will in part be obvious and will in part appear hereinafter.

This invention herein comprises an improvement in a multistage low temperature saline water distilling plant and process. The saline water is first preheated by passing it through the condensate coil in the plant's final stage. Subsequently the preheated saline water is introduced into the first stage of the multistage plant. Each stage of said multistage plant is divided by an upstanding partition to separate the saline water from the potable water that is produced. Further, each stage is of low pressure which is progressively less from the first stage to the final stage.

In stage one the preheated saline water is heated further and vaporized at a temperature below the rapid scaling temperature of saline water discussed above. The vapor is condensed on the exterior of a unique heat transfer percolation coil and the condensate is collected as potable water.

As the vapor is condensed, saline water, which acts as the cooling medium for said coil, enters the lower end of the coil from the next stage and is heated within the coil to its boiling point. It should be noted that the boiling point is lower than the boiling point of the preceding stage because of the lesser pressure. The vapor produced is then condensed on a second heat transfer percolation coil and the condensate collected as potable water, as in the first stage.

The cooling medium of the heat transfer coil of said next stage is the saline water from a further stage. Thus the coil both condenses the vapor of said next stage and heats the saline water of the further stage, in a similar manner as the several heat transfer percolation coils discussed above.

The vapor produced in the final stage is condensed on the condensate coil of said final stage. This coil, as discussed above, is cooled by the incoming fresh saline water. The condensate in the final stage is also collected as potable water. All condensates are combined.

The invention accordingly comprises the several steps and the relation of one or more of such steps with respect to each of the others and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings in which:

A diagrammatic view of a multistage low-temperature saline water distillation plant comprising the subject matter of the instant invention is shown.

Referring now to the drawing in detail, there is shown a multistage saline water distilling unit generally designated 10, of the open percolation type.

The unit shown consists of three stages—a first stage A, an intermediate stage B, and a final stage C. Although not shown, it is to be understood that additional intermediate stages may be added depending on the capacity desired. Each stage comprises an enclosed chamber divided by vertical partitions 11, 12, and 13 respectively, to form tanks 14, 15 and 16, for containing saline water and tanks 17, 18 and 19 for collection of potable distillate. Vapor collection areas 20, 21 and 22 are located above the tanks in each stage.

A low pressure is induced into each stage by a vacuum pump 23 and the low pressure within each stage is regulated by pressure regulator valves 24, 25 and 26 for each stage respectively.

Describing the saline water flow system, saline feed water from a suitable source is circulated by a suitable pump 27 through a condenser 28 carried within final stage C. Here, during continuous operation, the temperature of the saline water is heated to about 100° F.

A portion or all of the preheated saline water is then passed through a three-way solenoid valve 29 and a deaerator 30 before entering the saline water tank 14 in the first stage A. From tank 14, the saline water flows through water level control valves 31 and 32 to saline water tank 15 in intermediate stage B, and from tank 15 to saline water tank 16 in final stage C via water level control valves 33 and 34. The saline water is finally pumped from tank 16, through water level control valve 35, by a suitable brine pump 36 whereafter it is subsequently discharged. If desired, it may be passed through a heat transfer coil to heat the incoming saline water and then may be subsequently discharged.

The saline water level in tanks 14, 15 and 16 is maintained at the desired level indicated at 37, 38 and 39, respectively, by water level and flow rate control valves 31, 32, 33, 34 and 35 respectively. These valves control the volume and rate of flow to and from the tanks in a manner well-known in the art. When the saline water level reaches the desired level 37 in tank 14 in first stage A, suitable sensing means 40 electrically actuates the three-way solenoid valve 29 which thereafter directs the saline feed water to the waste outlet 41.

In operation of the system, the pressures within the stages are reduced as follows: 25.9 inches of mercury in stage A, 27.1 inches of mercury in stage B and 27.9 inches of mercury in stage C.

Referring to first stage A, the saline water within tank 14 is heated to approximately 126° F. by an immersed heating coil 42, and the heater may either be an electric resistance heater, a steam-coil or other known means. Due to the low pressure of 25.9 inches of mercury in stage A, the saline water will boil at a relatively low temperature of approximately 126° F. Vapor will be released to the vapor collection space 20. Since the vapor is saturated, its temperature will also be 126° F. It condenses when it comes in contact with heat transfer percolation coil 43 located within tank 17 above a normal level of collected condensate 44. The coil 43, carried on a wall of stage A adjacent to stage B, has its lower end in communication with saline water 45 in tank 15 of intermediate stage B, while the upper end of the coil vents to the vapor collection space 21 of stage B. As the saline water enters the coil, it is lower than the 126° F. vapor temperature in stage A. Consequently, the vapor in stage A condenses on the exterior of the heat transfer percolation coil 43 and the condensate 44 therefrom is collected within tank 17 as potable water.

As the vapor in stage A collects and condenses on the coil 43, heat is transferred through the percolation coil increasing the temperature of the saline water therein to approximately 113° F. At this temperature, since the vapor pressure in stage B is maintained at 27.1 inches of mercury, percolation occurs. Vapor and hot saline water emit from the top of the coil. As this water within the heat transfer coil 43 percolates, it is replaced by saline water 45 from tank 15. Thus circulation is maintained.

The vapor from the coil 43 transfers to vapor collection space 21 of intermediate stage B.

In a manner similar to stage A, the vapor released in stage B is condensed on a heat transfer percolation coil 46 located within tank 18. The coil 46, which is carried on a wall of stage B adjacent to final stage C, has its lower end in communication with the saline water 48 within tank 16 of stage C. The upper end of the coil vents to the vapor collection space 22 of stage C. Since the saline water within stage C and included within the heat transfer coil is lower than 113° F., the vapor within intermediate stage B condenses on the exterior of the coil 46 and the condensate 47 is collected. It is subsequently combined with the condensate 44 of stage A.

The heating process within heat transfer coil 46 to produce a vapor in final stage C is essentially as described for stage B and heat transfer percolation coil 43. As the vapor in stage two is condensed on the coil 46, the saline water within the coil increases in temperature, to approximately 100° F. Such temperature is sufficient, due to stage C's low pressure of 27.9 inches of mercury, to cause flashing at the upper end of coil 18 in contact with vapor collection space 22 of stage C. As vapor is released, the water is replaced within the coil from saline water 48 within tank 16 of stage C. Circulation of water is thus maintained in the coil 46. The vapor within the final stage C is condensed as it comes in contact with condensate coil 28 since the fresh saline water circulating within the coil is lower than 105° F. (usually about 85° F.). The condensate 50 is collected within tank 19 and subsequently combined with the condensates 44 and 47 of stages A and B respectively.

In all stages, when condensation occurs on the outer surfaces of the heat transfer percolation coils 43 and 46 of stages A and B, and condensate coil 49 of stage C, a drop of water vapor pressure is experienced in the respective stages, causing increased boiling and evaporation of the saline water.

The condensates 44, 47 and 50 from tanks 17, 18 and 19, respectively, are combined by a suitable condensate pump 51. Before such combining the condensate of each tank is routed through each stage's respective salinity cells 52, 53 and 54, and three-way solenoid valves 55, 56 and 57. If the condensate has an acceptable salinity level, the three-way solenoid operated valves permit the condensate to pass through to storage. However, if the level of salinity is unacceptable, the valves route the water to pump 70 via pipe 58 which may connect to inlet pump 27 (not shown) or discard. One-way valves 59 for the condensate collecting system and 60 for the saline water recirculation system prevent any "backflow" by reason of the subatmospheric pressure maintained in each stage. One-way valves 61 act similarly with respect to saline water to waste pipe 62. Variously located pressure meters 63 and variously located thermometers 66 for more accurate control, and a filter 67 for purity of the plant just described are also utilized. A water meter 68 in the condensate collecting system measures the yield of water obtained.

Although the invention has been shown and described in relation to the term "saline water" it should be understood that the principles of this invention are equally applicable to other forms of water or organic solvent which might be desirably distilled to effect separation of impurities or undesired solutes.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A multistage distilling plant especially useful for converting saline water to potable water comprising a plurality of chambers in each of said stages, said chambers in each stage defining a receiving area for saline water to be evaporated, a vapor collection area for the evaporated water and a condensate area for condensing the vapor and storing the condensate, condensing means disposed above the condensate level in each condensate area for condensing the vapor, said stages being staged successively for evaporation of the saline water in each stage from a first boiling higher pressure higher temperature state to a later boiling lower pressure lower temperature stage, means to maintain said pressures in said stages, means to heat said saline water in the first stage to its boiling point, means to circulate the saline water of one stage to a subsequent stage and from the final stage to waste, and condensing means in at least one of said stages comprising a heat exchanger percolation coil in which the saline water from a subsequent stage is circulated therethrough and returned to said subsequent stage, said circulated saline water being heated by the condensation of the vapor to its boiling point.

2. The multistage distilling plant of claim 1 wherein the condensing means of the final stage comprises a heat exchanger in which incoming saline water is circulated and preheated before entering the first stage by the condensation of the evaporated water of the final stage.

3. The multistage distilling plant of claim 1 wherein said heat exchanger comprises a heat transfer percolation coil having its lower end in communication with the saline water receiving area of the next stage and its upper end in communication with the vapor collection space above the saline water of said next stage whereby saline water within the coils is heated to its vaporization point and discharged into the vapor collection space.

4. The multistage distilling plant of claim 1 wherein the subatmospheric pressure of each stage is assisted by the condensation of the vapor of that stage.

5. The multistage distilling plant of claim 1 having means to collect and combine the condensate of each stage.

6. A method for extracting substantially pure distillate from a solution, such as potable water from saline water, comprising the steps of preheating said solution and then introducing it seriatim into a first and subsequent stages of a multistage distilling plant, further heating said solution in said first stage under a subatmospheric pressure to a relatively low vaporization temperature, maintaining a progressively lesser subatmospheric pressure in each of said subsequent stages, condensing the vapor of at least one stage by conducting it in indirect heat exchange relationship with a portion of the solution withdrawn from the next stage and returned thereto such that as the vapor is condensed in said one stage, the heat transferred by the condensation heats said withdrawn solution portion of the next stage to its point of vaporization, and collecting the substantially pure water condensate from each of said stages.

7. The method of claim 6 wherein said preheating of said solution is accomplished by passing it in heat exchange relationship with the condensate of the final stage of said multistage distilling plant.

References Cited

UNITED STATES PATENTS

| | | | |
|---|---|---|---|
| 3,119,752 | 1/1964 | Checkovich | 202—173 X |
| 3,218,241 | 11/1965 | Checkovich | 203—7 |
| 3,334,023 | 8/1967 | Fritz | 203—11 X |
| 3,351,120 | 11/1967 | Goeldner et al. | 159—13 |
| 3,367,845 | 2/1968 | Coit et al. | 202—173 X |
| 3,401,094 | 9/1968 | Lindsay | 203—7 |
| 3,427,227 | 2/1969 | Chamberlin | 202—173 |

NORMAN YUDKOFF, Primary Examiner

F. E. DRUMMOND, Assistant Examiner

U.S. Cl. X.R.

202—174, 181; 203—3